July 8, 1924.
G. T. MORRIS
CONNECTING ROD
Filed Aug. 21, 1923
1,500,515
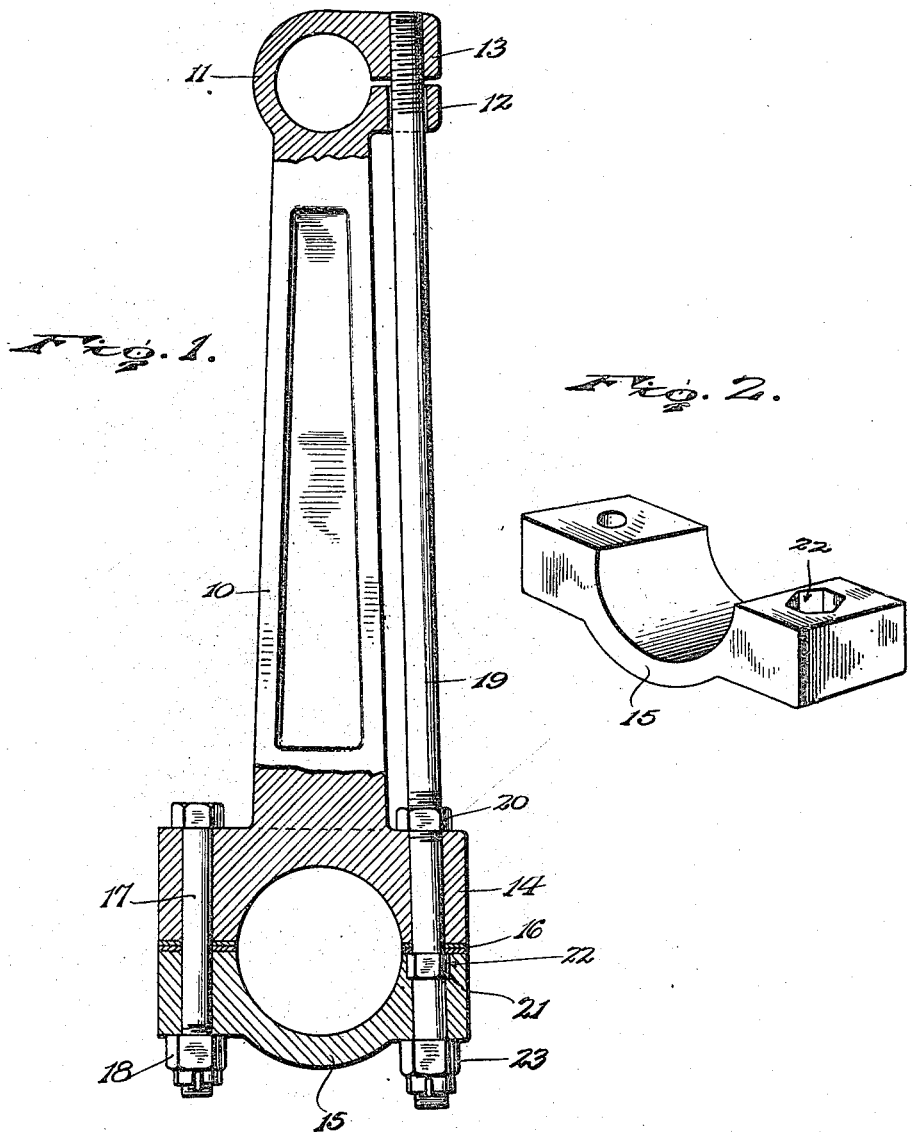

Patented July 8, 1924.

1,500,515

UNITED STATES PATENT OFFICE.

GEORGE TOMAS MORRIS, OF ST. LOUIS, MISSOURI.

CONNECTING ROD.

Application filed August 21, 1923. Serial No. 658,577.

*To all whom it may concern:*

Be it known that I, GEORGE TOMAS MORRIS, a citizen of the United States, residing at St. Louis, in the State of Missouri, have invented certain new and useful Improvements in Connecting Rods, of which the following is a specification.

This invention relates to an improved connecting rod particularly designed for use in conjunction with internal combustion engines although, as will later appear, the rod is well adapted for general use and seeks, among other objects, to provide a connecting rod wherein the wrist pin bearing of the rod may be tightened without the necessity for removing the piston to which the rod is attached, from the engine.

The invention seeks, as a further object, to provide a connecting rod wherein by removing the bottom plate of the engine crank case, the wrist pin bearing of the rod as well as the crank pin bearing thereof, may be tightened through the bottom opening of the crank case.

And the invention seeks, as a still further object, to provide a connecting rod wherein the adjusting means employed for the bearings of the rod will also function as a reinforcement therefor.

Other and incidental objects will appear hereinafter.

In the drawings:

Figure 1 is a side elevation of my improved connecting rod, parts being broken away and illustrated in section, and Figure 2 is a detail perspective view of the bearing cap of the rod.

In carrying the invention into effect, I employ a rod shank 10 tapered toward one end thereof and formed with a split wrist pin bearing 11 having mating laterally directed ears 12 and 13 respectively. Formed on the shank 10 at its opposite end is an overhanging bearing block 14 and mating with said block is a bearing cap 15 cooperating with the block to form a bearing for receiving a crank pin. Suitable shims 16 may be interposed between the cap and block and extending through said cap and block at corresponding ends thereof is a bolt 17 equipped at its lower end with a nut 18. Extending through opposite corresponding ends of the cap and block is an adjusting rod 19 which, at its upper end, freely fits through the ear 12 of the wrist pin bearing 11 and is threaded into the ear 13 of said bearing. Threaded upon the rod to abut the adjacent end of the bolck 14 at its upper side is a nut 20 and formed on the rod to cooperate with said block at its lower side is a hexagon shoulder 21. As shown in detail in Figure 2, the bearing cap 15 is formed at its adjacent end with a hexagon socket or recess 22 snugly receiving said shoulder and threaded upon the rod at its lower end is a nut 23.

As will now be seen in view of the preceding description, by removing the nuts 18 and 23 of the bolt 17 and rod 19 and displacing the bearing cap 15, a wrench may be applied to the shoulder 21 of said rod for rotating the rod and consequently drawing the ear 13 of the wrist pin bearing 11 downwardly toward the ear 12 and tightening said bearing about the wrist pin of the piston to which the rod is attached. The nut 20 is, of course, previously loosened to permit the rotation of the rod and after the wrist pin bearing has been thus tightened, the nut is again threaded downwardly upon the adjusting rod to abut the adjacent end of the bearing block 14. The nut will thus cooperate with the shoulder 21 for limiting the rod against endwise movement. The bearing cap 15 is then applied about the crank pin of the engine when the bolt 17 is inserted through the block 14 and through the cap and the nut 18 applied to the bolt and the nut 23 applied to the rod. Said nuts may then, of course, be adjusted for tightening the bearing cap of the rod about said crank pin, and, as will be observed, the nut 20 will cooperate with the block 14 to rigidly sustain endwise pull upon the rod 19 when the nut 23 is thus adjusted. At the same time, the walls of the socket 22 will coact with the shoulder 21 for holding the rod 19 against rotation and locking the wrist pin bearing 11 in adjusted tightened position.

Having thus described the invention, what is claimed as new is:

1. A connecting rod including a shank provided at one end with a split wrist pin bearing and at its opposite end with a bearing block, a removable bearing cap mating with said block, means coacting with the wrist pin bearing adjustable for tightening said bearing and extending through the block and cap connecting the cap with the block, and coacting means carried by said cap and said first mentioned means locking said first mentioned means in adjusted position.

2. A connecting rod provided at one end with a split wrist pin bearing and at its opposite end with a bearing block, a rod rotatably fitting through the block to engage said bearing and provided with a shoulder to cooperate with the block whereby the rod may be rotated for tightening the bearing, and a bearing cap mating with said block and connected therewith by said rod.

3. A connecting rod provided at one end with a split wrist pin bearing and at its opposite end with a bearing block, a rod rotatably fitting through the block to engage said bearing and provided with a shoulder to cooperate with the block whereby the rod may be rotated for tightening the bearing, and a bearing cap mating with said block and connected therewith by said rod, the cap being recessed to snugly accommodate said shoulder coacting therewith for locking the rod in rotatably adjusted position.

4. A connecting rod provided at one end with a split wrist pin bearing and at its opposite end with a bearing block, a bearing cap mating with said block, a rod extending through the cap and block to engage said bearing and adjustable for tightening the bearing, a nut upon the rod adjustable for clamping the cap in cooperative relation to the block, and a second nut upon the rod coacting with the block for sustaining the rod against the endwise pull of said first mentioned nut.

5. A connecting rod including a shank provided at one end with a wrist pin bearing and at its opposite end with a bearing block, means coacting between said block and the bearing and adjustable for tightening the bearing, a bearing cap mating with said block, and coacting means carried by the cap and said first mentioned means locking the said first mentioned means in adjusted position.

In testimony whereof I affix my signature.

GEORGE TOMAS MORRIS. [L. S.]